M. SICHMELLER.
TRAP.
APPLICATION FILED MAR. 27, 1920.
1,360,038.
Patented Nov. 23, 1920.
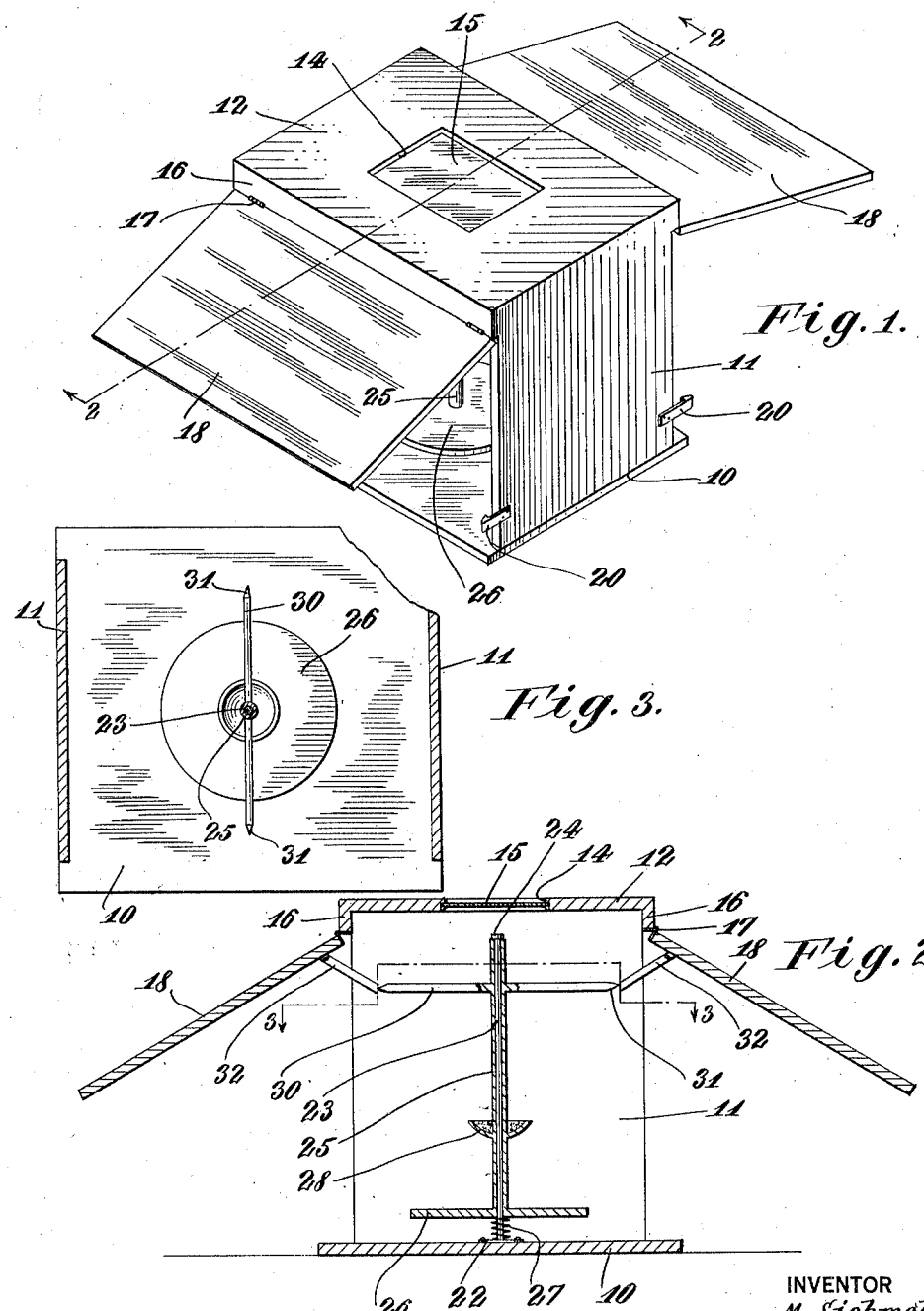

UNITED STATES PATENT OFFICE.

MAGGIE SICHMELLER, OF WEBSTER, SOUTH DAKOTA.

TRAP.

1,360,038.  Specification of Letters Patent.  Patented Nov. 23, 1920.

Application filed March 27, 1920. Serial No. 369,272.

*To all whom it may concern:*

Be it known that I, MAGGIE SICHMELLER, a citizen of Poland, residing at Webster, county of Day, and State of South Dakota, have invented certain new and useful Improvements in Traps, of which the following is a specification.

This invention relates to improvements in traps, such as are used in catching small animals, birds and the like, and has as its special object, the provision of a trap of simple construction, and through which light and air may readily pass.

A further object is to provide a trap which does not tend to frighten the animal or bird prior to capture.

And finally to provide a trap which may be set in an easy manner, and which, upon being sprung, effectively secures the animal within.

These and other like objects are attained by the novel construction and combination of parts hereinafter described and shown in the accompanying drawings, forming a material part of this disclosure, and in which—

Figure 1 is a perspective view showing a trap made in accordance with the invention.

Fig. 2 is a vertical transverse sectional view taken substantially on line 2—2 of Fig. 2, and, Fig. 3 is a horizontal sectional view taken on line 3—3 of Fig. 2.

The trap is comprised of a base plate 10, here shown to be substantially rectangular, and from which rise end walls 11, joined at the top by a rigid cover 12, which contains a central aperture 14, having a transparent panel 15.

Extending downwardly from the cover, along the sides of the trap, are longitudinal strips 16 having secured to their lower edges, hinges 17, connecting side plates 18 which are free to swing pendantly downward against the end walls 11, or be raised into operative position as indicated.

When the side plates 18 are dropped against the edges of the end walls 11, they are held in position by spring detents 20 the same being of hook formation, presenting beveled outer surfaces against which the edge of the plates makes contact, momentarily springing the detents away under the impetus of the blow and instantly engaging the plates, preventing them from being raised from the interior.

Mounted upon the upper surface of the base 10, centrally therewith, is a flange 22 from which rises a central vertical spindle 23 having an enlarged head 24 and mounted freely upon the spindle 23 is a sleeve 25 carrying at its base a circular disk 26, the sleeve being supported upon the upper end of a coiled compression spring 27, the lower end of which rests upon the upper surface of the flange 22, thus holding the disk 26 slightly above the base 10.

Also secured upon the sleeve 25, above the disk 26, is a concave lure-containing vessel 28 adapted to receive any appropriate bait or lure whatever, and in order to reach the same, the animal must necessarily place its feet upon the disk 26, overcoming the pressure of the spring 27 and lowering the sleeve.

Engaged with the upper portion of the sleeve 25 are a pair of oppositely disposed arms 30 terminating in sharp points 31 adapted to engage with the ends of short lever-like arms 32 extending angularly inward from the side plates 18, the arrangement being such that as the sleeve is lowered by the act of an animal in attempting to reach the lure, the arms 30 are brought downward, freeing the levers 32, and permitting the side plates 18 to drop by gravity, inclosing the animal upon the base 10, while the plates become engaged with the spring detents 20 preventing the animal from passing out of the trap.

The operation of setting the trap consists in merely raising the side plates 18 until the lever arms 32 make contact with the points 31, of the arms carried by the sleeve which, at that time, is raised into operative position by the spring 27, and obviously upon depressing the sleeve the arms will be dislocated, permitting the side plates to drop, ensnaring the animal therewithin.

Having thus described my invention what I claim is new and desire to secure by Letters Patent, is—

1. In a trap, the combination with a rectangular hollow casing, of side walls hingedly engaged along their upper edges near the top of said casing, means for engaging said side walls when in a closed position, a spindle mounted vertically in said casing, a sleeve slidable on said spindle, a platform carried by said sleeve, a lure container on said sleeve, a spring support for said sleeve, a pair of arms carried at the upper edge of said sleeve, and a pair of supports extending inwardly from said side walls adapted to engage with the arms of said sleeve.

2. In a trap, the combination with a hollow rectangular casing, of a pair of plates hingedly engaged at their upper edge to the upper portion of said structure adapted to cover the sides of said casing, a transparent panel arranged in the cover of said casing, means for engaging said side plates when in a lowered position, a vertically sliding lure element movable centrally in said casing, a spring support for said lure element, arms fixed upon said lure element, and projections extending inwardly from said side plates adapted to make contact with the ends of said arms.

3. In a trap, the combination with a hollow rectangular structure, comprising a base, end walls and a cover, of a pair of side plates hingedly engaged below said cover, spring detents fixed upon the end walls of said casing adapted to engage with said side plates when in a lowered position, a spindle rigidly fixed on said base extending vertically upward in said casing, a sleeve freely mounted on said spindle, a platform carried by said sleeve, a spring support for said sleeve, a lure carrying receiver mounted on said sleeve, a pair of arms extending oppositely outward near the top of said sleeve, and projections extending inwardly from said hinged side plates adapted to engage with the ends of said arms whereby said plates are normally held in an extended position.

In testimony whereof I have affixed my signature.

MAGGIE SICHMELLER.